United States Patent [19]

Maurice et al.

[11] Patent Number: 5,771,142
[45] Date of Patent: Jun. 23, 1998

[54] MULTITRACK MAGNETIC WRITE/READ HEAD ARRANGEMENT WITH INTEGAL MULTIPLE HEAD GAP WIDTHS

[75] Inventors: François Maurice, Verrieres le Buisson; Jean-Marc Coutellier, Maurefas, both of France

[73] Assignees: Thomson-CSF, Paris; Thomson Multimedia, Courbevoie, both of France

[21] Appl. No.: 496,325

[22] Filed: Jun. 29, 1995

[30] Foreign Application Priority Data

Jul. 1, 1994 [FR] France .................................. 94 08161

[51] Int. Cl.[6] .................................................. G11B 5/265
[52] U.S. Cl. ........................................................... 360/121
[58] Field of Search ............................................. 360/121

[56] References Cited

U.S. PATENT DOCUMENTS

| | | | |
|---|---|---|---|
| 3,158,846 | 11/1964 | Silverman | 360/71 |
| 4,101,947 | 7/1978 | Lambeth | 360/114 |
| 4,805,051 | 2/1989 | De Marco et al. | 360/121 |
| 5,124,869 | 6/1992 | Lehureau | 360/121 |
| 5,132,861 | 7/1992 | Behr et al. | 360/121 |
| 5,436,780 | 7/1995 | Nagata et al. | 360/121 |

FOREIGN PATENT DOCUMENTS

| | | |
|---|---|---|
| 0 340 085 | 11/1989 | European Pat. Off. . |
| 38 42 079 | 6/1990 | Germany . |
| 1 478 340 | 6/1977 | United Kingdom . |
| 1 585 268 | 2/1981 | United Kingdom . |

OTHER PUBLICATIONS

IBM Technical Disclosure Bulletin, vol. 28, No. 2, Jul. 1985, Armonk, N.Y., p. 558 "Variable Track Density Magnetic Head".
Patent Abstracts of Japan, vol. 7, No. 10 (P–168) Jan. 14, 1983 of JP–A–57 167 118 (Sony K. K.), Takahashi Oct. 14, 1982.
IBM Technical Disclosure Bulletin, vol. 15, No. 6, Nov. 1972, Armonk, N.Y., p. 1886 "Multitrac Transducer with Track Sensitivity".
Patent Abstracts of Japan, vol. 16, No. 514 (P–1442) Oct. 22, 1992 of JP–A–04 188 415 (Cannon Electron Inc) Ryaichi et al. Jul. 7, 1992.

Primary Examiner—Craig A. Renner
Attorney, Agent, or Firm—Oblon, Spivak, McClelland, Maier & Neustadt, P.C.

[57] ABSTRACT

Magnetic write/read heads for writing/reading information on a recording medium passing in front of the heads include several groups of magnetic write/read heads, each group of magnetic write/read heads including several pairs of poles. Each pair of poles is separated by a head gap of an integer multiple of an elementary track width b and forms several head gaps E0 to E7. The head gaps (for example E1) have a first width such that they can write across a first width of the recording medium, and the second head gaps (for example E2) have a second width less than the first width and are arranged in such a way that the second head gaps write/read an area of the recording medium superimposed on the area of the recording medium write/read by the first head gaps. The magnetic write/read heads are suitable for applications where multitrack write/read heads are required.

8 Claims, 5 Drawing Sheets

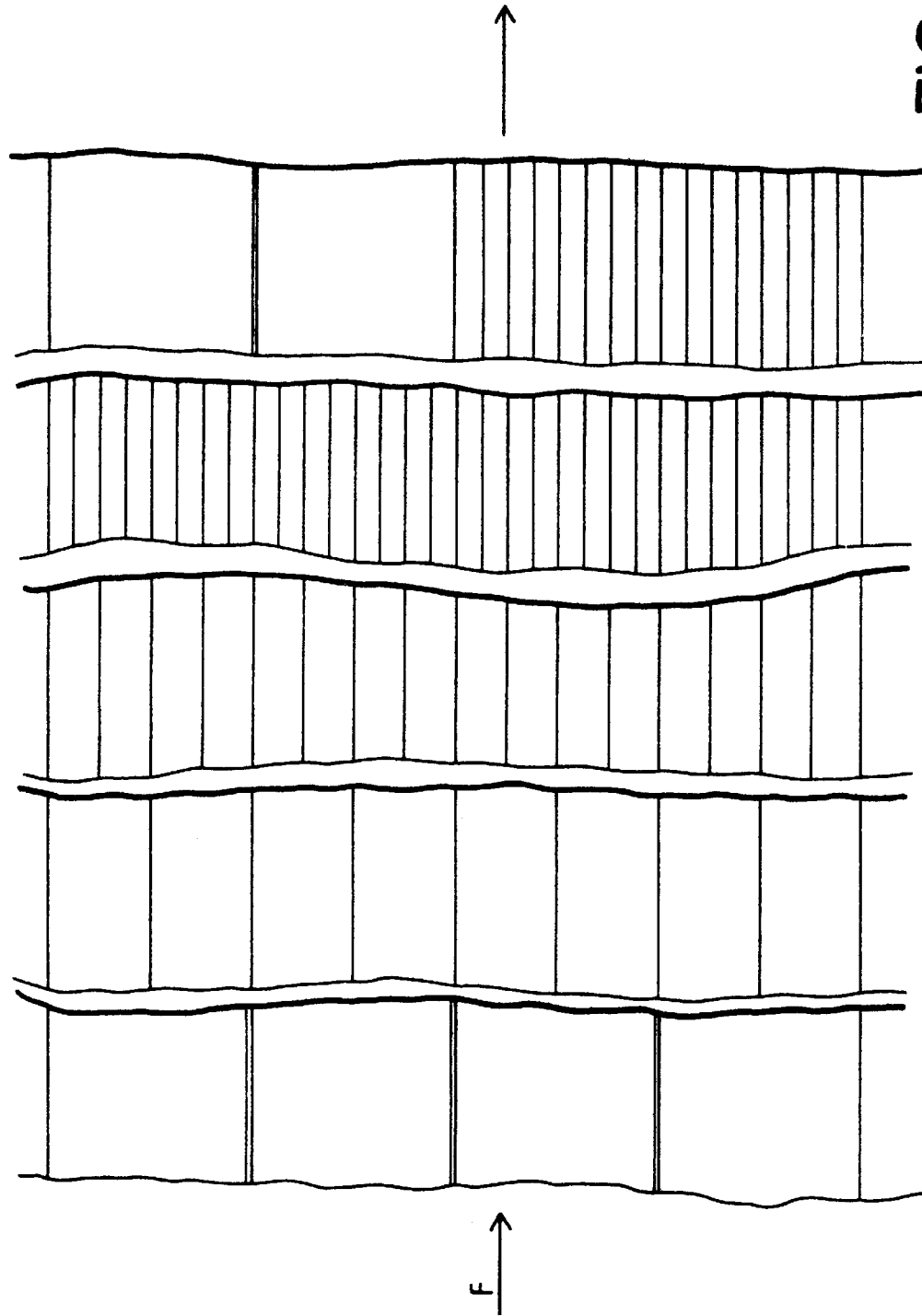

MULTITRACK MAGNETIC WRITE/READ HEAD ARRANGEMENT WITH INTEGAL MULTIPLE HEAD GAP WIDTHS

BACKGROUND OF THE INVENTION

This invention concerns magnetic circuits for a set of magnetic write/read heads particularly applicable to write/read systems on multitrack media such as tapes, disks and magnetic cards. For tapes and disks, it is applicable to professional type recorders for television, computers special recorders and for equipment to be used by the general public.

Recording systems considered are characterized by tracks containing magnetic information parallel to the direction in which the magnetic medium advances. This is usually obtained simply by the use of fixed multitrack heads held in contact with the mobile magnetic medium.

These heads are designed to write a number of parallel tracks (a few tens or even a few hundreds, using current techniques).

The purpose of the invention is to be able to generate a variable number of variable width tracks, using a single component.

The invention concerns systems using matrix write heads, for example as described in U.S. Pat.No. 5,124,869.

FIG. 1 shows this system schematically, showing a write head according to the above mentioned Patent Application, associated, for example, with a magneto-optic read head according to U.S. patent application Ser. No. 08/433,031.

FIG. 2 shows a write head (TM) consists of several groups A to D of write head gaps E0 to E7. This is what makes it possible to write narrow and adjacent tracks onto medium (BM) moving in direction F;

One idea that springs to mind is to write wider tracks by putting narrow tracks with identical contents adjacent to each other. Unfortunately this is impossible, since the bits in adjacent tracks are written at different times, and the tape transport precision is insufficient to align them perfectly (the length of bits is less than one micrometer).

The invention solves the above stated problem.

SUMMARY OF THE INVENTION

This invention concerns a layout of magnetic write/read heads containing several pairs of poles, the poles in any one pair being separated by a write head gap, wherein the lengths of the head gaps are different for each pair of poles.

Furthermore, the invention concerns a layout of magnetic heads, wherein for writing information on a recording medium passing in front of the magnetic heads, the first head gaps have a first length so that they can write across the width of the medium, and the second head gaps have a second length less than the first length and are located with respect to the first head gaps so as to write in the same medium width superimposed on the first head gaps.

More precisely, the objective of the invention is a layout of magnetic heads, wherein for writing/reading N elementary tracks of width b.

N/2 head gaps have a length equal to b x (2/2)
N/4 head gaps have a length equal to b x (4/2)
N/8 head gaps have a length equal to b x (8/2)
N/N head gap has a length equal to b x (N/2)
One head gap has a length equal to b x N

BRIEF DESCRIPTION OF THE DRAWINGS

The various objectives and characteristics of the invention will become more clear by reading the following description which is provided as an example and the figures in which:

FIG. 4 shows different types of track widths that can be written and read with a magnetic head layout such as that shown in FIGS. 3a and 3b.

DETAILED DESCRIPTION OF THE INVENTION

Figure 1:
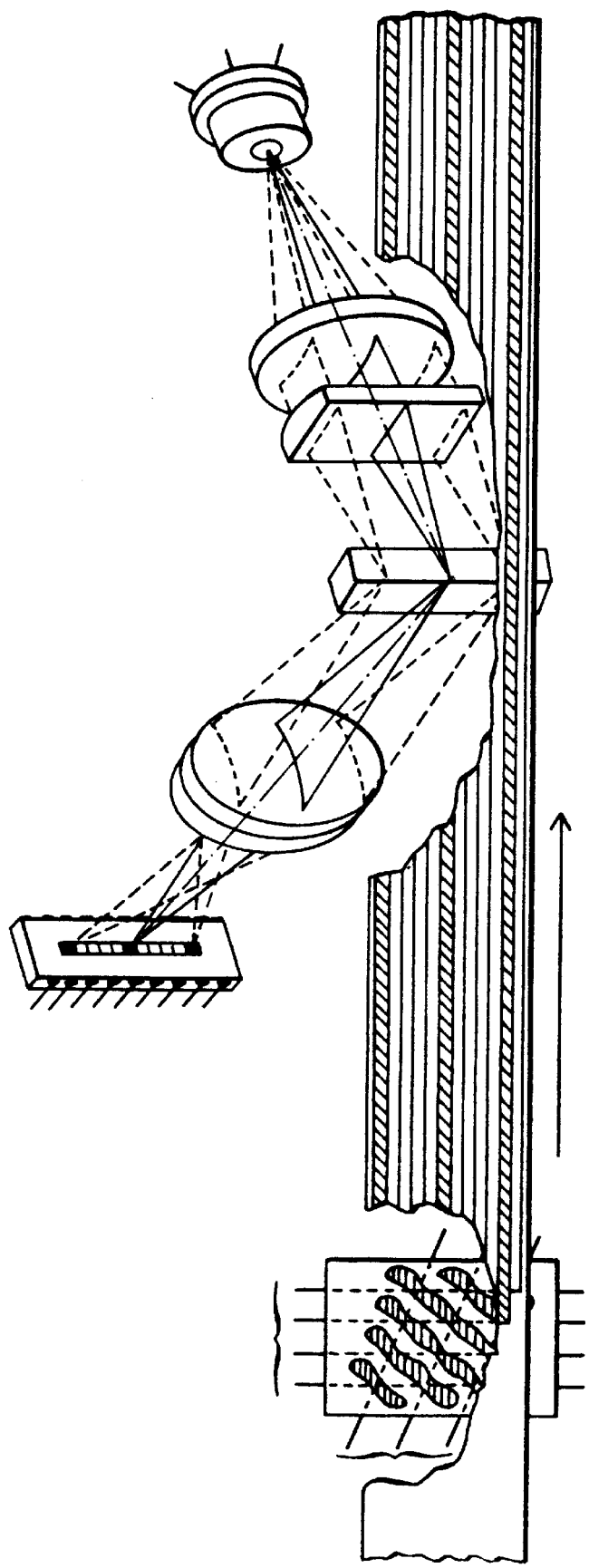
FIGS. 1 and 2 show a write/read system using known techniques and described previously.
Figure 2:
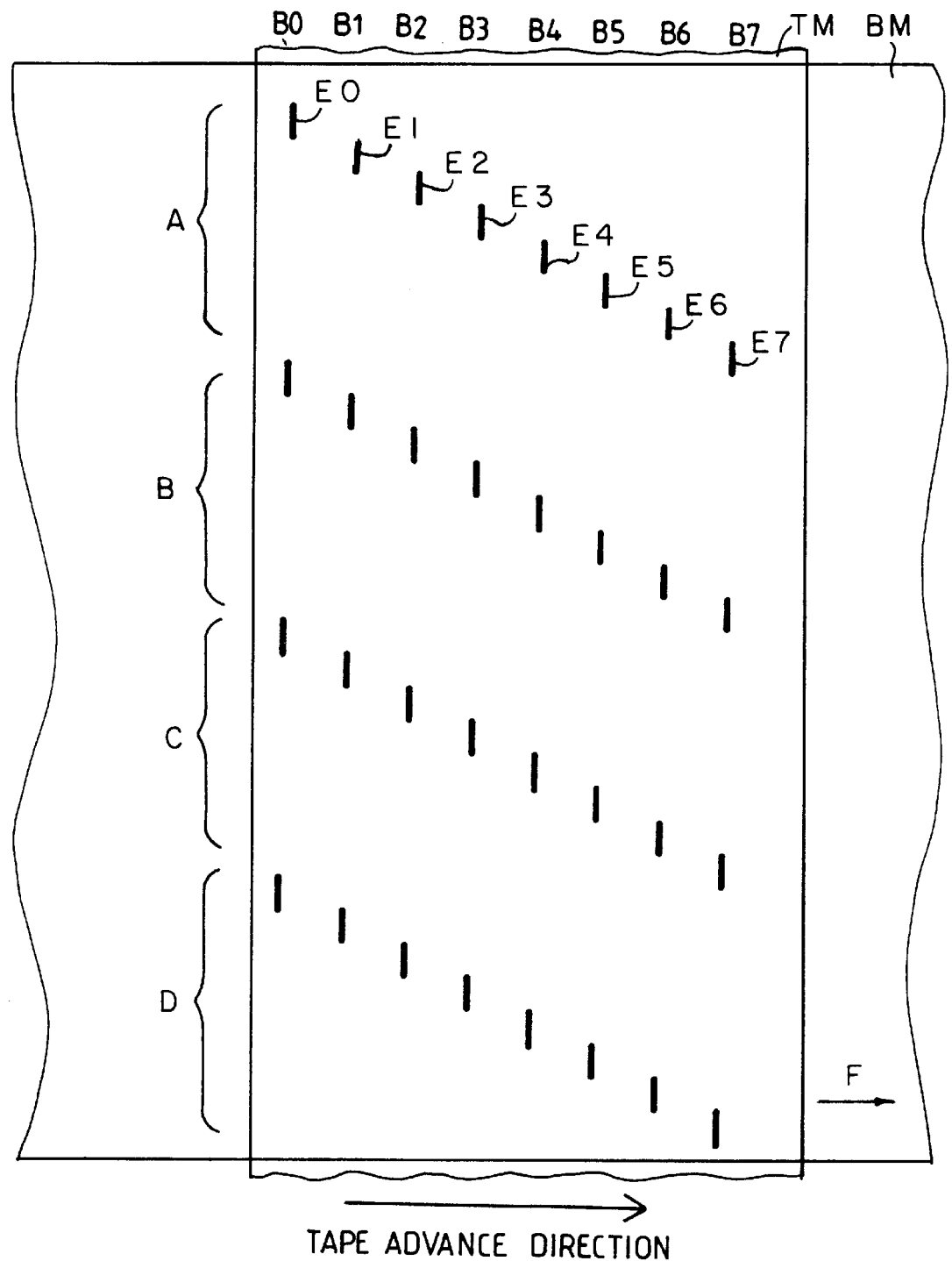
Figure 3A:
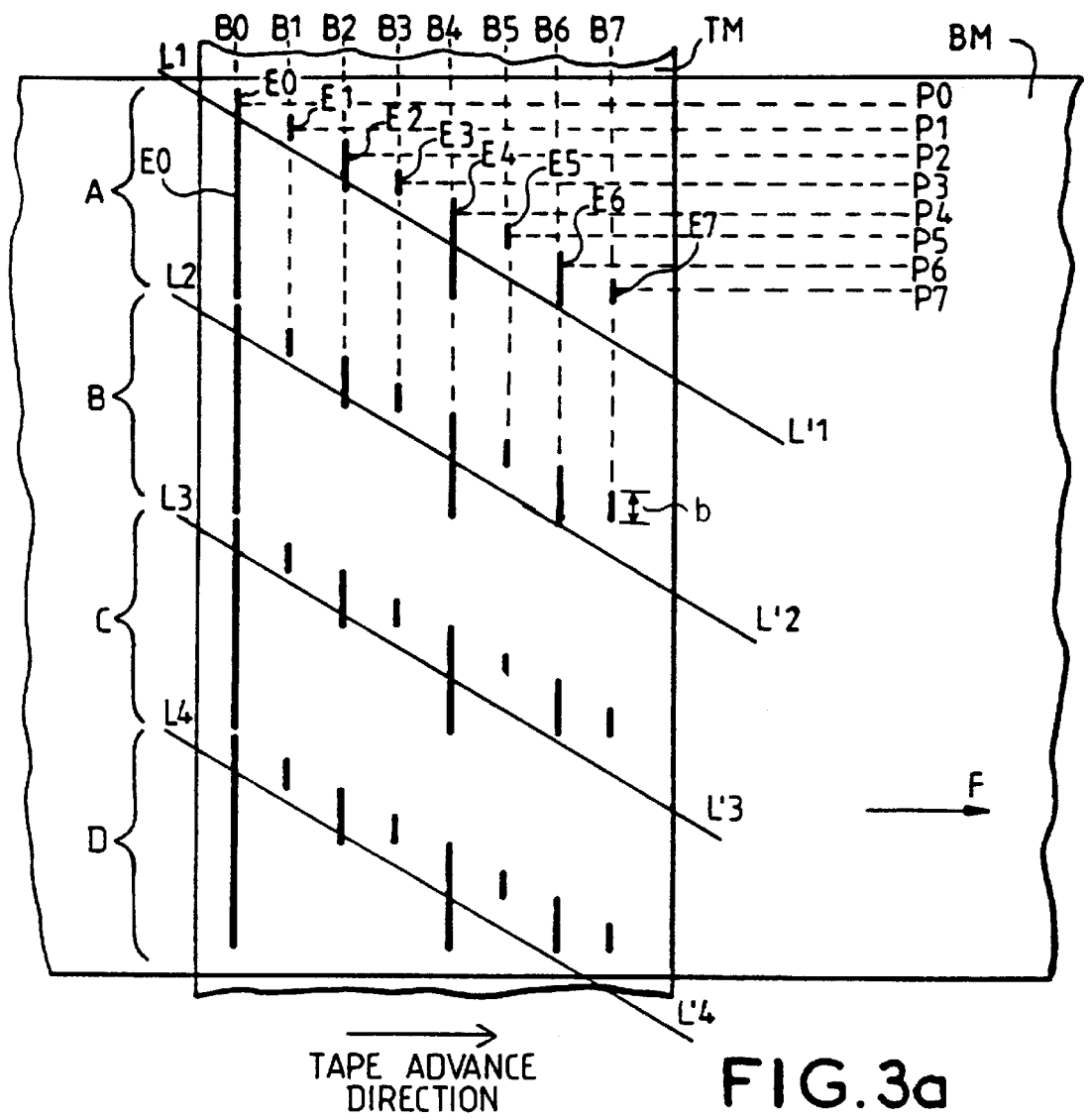
FIGS. 3a and 3b show a layout of magnetic heads according to the present invention.
Figure 3B:
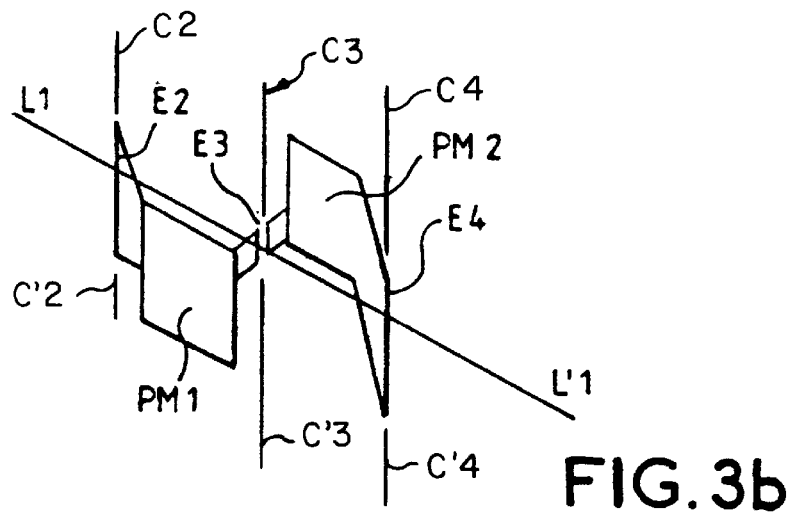

Referring to FIGS. 3a and 3b, we will therefore describe an example of the layout of magnetic heads according to the present invention. FIG. 3ashows a schematic view of all head gaps in a layout of magnetic heads.

The basic principle is as follows:

variable widths of head gaps coexist in the same assembly;

each head has a good overwrite capacity.

The magnetic head, TM, assembly is placed adjacent to a magnetic medium (magnetic tape, BM), to be read or written. The tape, BM, moves in front of magnetic heads along direction F.

Head gaps E0, E1, E2, E3, ...E7 are in planes B0, B1, B2, B3, ...B7, transverse to direction F. According to one preferred method of construction, these planes are perpendicular to direction F.

The set of magnetic heads, TM, comprises four groups of magnetic heads A, B, C and D. We will firstly consider heads group A.

Heads group A writes tracks occupying a quarter of the width of tape, BM. This group includes:

a head gap E0 which writes across the entire width of the quarter of the tape;

head gaps E1, E3, E5, E7, which divide the width of the tape into elementary widths.

The width b of a head gap such as that of E7 is equal to the width b of an elementary track.

the length of head gaps E2 and E6 is twice the width b of an elementary track;

the width of head gap E4 is four times greater than the width b of an elementary track.

Note that head gaps with odd numbers E1, E3, E5, E7 with an elementary width b are located in odd numbered planes B1 and B7. Furthermore, if writable (or readable) tracks on the tape BM are numbered from P0 to P7, these head gaps El to E7 are assigned to odd tracks P1 to P7.

The head gap E4 is located in a median plane B4 with respect to the planes containing the end head gaps El and E7, and occupies half the width of the tape as seen by heads group A.

Head gaps E2 and E6 are located in planes B2 and B6 and between the first two head gaps with elementary lengths E1 and E3 and between the last two head gaps E5 and E7, respectively.

The set of all these head gaps may thus be controlled in a binary mode.

Furthermore, the advantage of this layout lays in the fact that within a matrix control, each magnetic head shown by its head gap on FIG. 3a may be controlled by a first wire (column wire) contained in one plane (B0 to B7) to which the head gap belongs and by a second wire L1, L'1 (row wire) passing through the group A head gaps.

For example, FIG. 3b shows a method of making the poles for head gap E3. These poles are shown viewed from above and are made, for example, using the technique described in U.S. Pat. No. 5,124,869.

Magnetic poles PM1 and PM2 separated by head gap E3 are located on each side of the row wire L1–L'1 and column wire C3–C'3. Coordinated control of these two wires can induce writing magnetic flows that are added in magnetic head PM1-E3-PM2, and thus control this magnetic head.

For example, according to the technique described in U.S. Pat. No. 5,124,869, pole PM1 may be used to control the magnetic head for head gap E2 using wires C2–C'2 and L1–L'1. Similarly, pole PM2 may be used to control the head for head gap E4 using wires C4–C'4 and L1–L'1.

Magnetic head groups B, C, D in FIG. 3a are identical to heads group A. According to the matrix control thus described, the magnetic heads in these groups are controlled by the same column wires as C2–C'2, C3–C'3 etc., and by row wires L2–L'2 for group B, L3–L'3 for group C and L4–L'4 for group D.

Depending on the control of the column wires, it is possible to write (or read) track widths on the tape equal to the elementary width b defined above, or a multiple of b.

FIG. 4 shows different ways of writing with the set of magnetic heads in FIG. 3a.

Using the following heads, writing can be done:
with heads E0 only: ENR0 records, namely 4 wide tracks (width 8b)
with heads E0 and E4: ENR1 records, namely 8 adjacent tracks of width 4b
with heads E0, E2, E4, E6: ENR2 records, namely 16 adjacent tracks of width 2b
with all magnetic heads: ENR3 records, namely 32 adjacent tracks of width b
with only magnetic heads E0 of head groups A and b enabled and all magnetic heads of groups C & D enable-disabled, for example disable row wires L1–L'1 and L2–L'2: ENR4 records, 16 tracks over half of the width of the tape and 2 tracks of width 8b.

It becomes clear that, during the write process, a track may be written by several head gaps in sequence. Since the overwriting capacity is good, the only write that counts is the last write which deletes previous writes. Thus in the example presented above, when all rows are activated, track P7 is written by head gaps E0, E4, E6 and E7.

A magnetic tape written by this type of magnetic head may be read by the same type of head. It may also be read by a magneto-optic read head, for example, as described in U.S. Patent application No. 08/433,031 mentioned at the beginning of the description.

It must be possible to adapt reading to variable formats. When a magneto-optic read is being made, a DC Kerr transducer is in contact with the tape and each narrow track is analyzed by a different photosensitive element in a linear strip of photodiodes.

If we return to the situation of reading wider tracks, (an integer multiple of the narrowest width), it may be useful to take advantage of information obtained by all photodiodes analyzing a given track.

This is possible, for example, using the system described in U.S. Pat. No. 5,493,553. Data output from the charged coupled device (CCD) are digitized at the input to a processing chain. It is then possible to use information originating from the CCD for exploring the same track. This is a simple summation, which is better carried out after a high pass filter. This operation can improve the signal to noise ratio on wide tracks, which may be necessary if the tape is not very efficient, or for analog information.

Therefore, this method of operation only requires a modification to the read channel processing electronics.

A recorder using the techniques described above can read and write several tape formats, which is a big advantage since it guarantees compatibility between different products.

The invention provides the basis for machines capable of handling different formats transparently to the user.

The physical construction of the matrix head according to the invention is very little different from techniques described previously (for example U.S. Pat. No. 5,093,980). The only element to be modified is the mask defining the shape of the poles and the width of head gaps.

The concept may be simplified (only two or three track widths).

Figure 5:
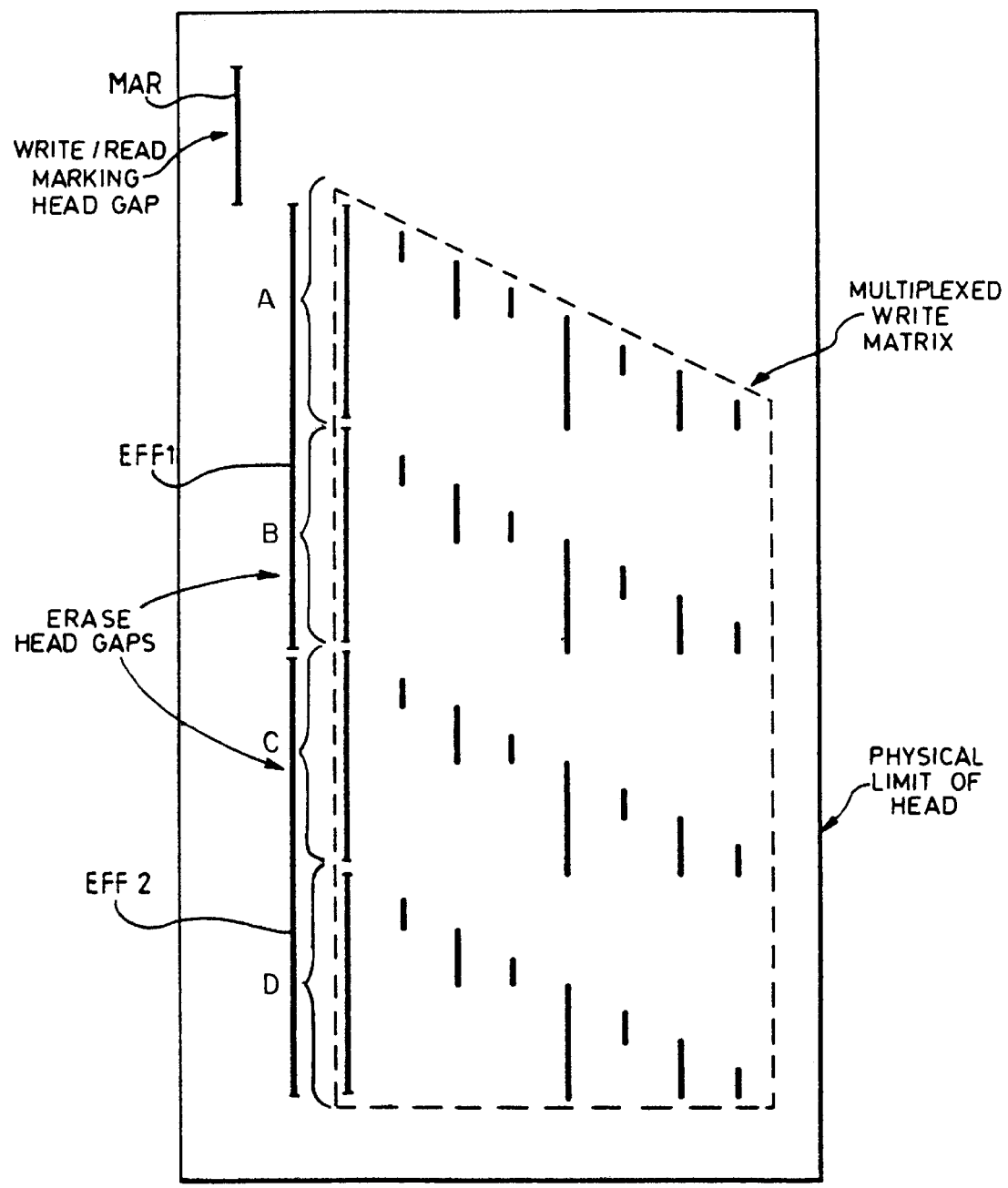
FIG. 5 shows an alternative layout of the magnetic heads according to the present invention.

FIG. 5 shows a set of magnetic heads containing head groups A, B, C, D in FIG. 3. In addition, erase heads EFF1 and EFF2, and a marking head MAR working in write and in read, are provided. FIG. 5 shows two erase heads, but it would be possible to provide a single head, or to provide more than two.

We claim:

1. A magnetic write/read head arrangement for writing/reading information on a recording medium passing in front of the head arrangement, comprising:

at least one group of magnetic heads, comprising;
several pairs of poles, each pair of poles being separated by a head gap,
widths of the head gaps being different for each pair of poles so that each head gap is capable of writing/reading portions of various widths on the recording medium according to the widths of the head gaps,
the head gaps being arranged so as to write/read superimposed portions of the recording medium,
a width of the recording medium written/read by the head gaps is divided into tracks of equal widths, each equal width being equal to an elementary track width,
each head gap having a width equal to an integer multiple of the elementary track width,
the width of at least one head gap of the head gaps being equal to the elementary track width, and the width of other head gaps of the head gaps being equal to $2^n$ multiples of the elementary track width, where n is an integer number greater than 0.

2. The magnetic head arrangement according to claim 1, wherein for the tracks including N tracks and the elementary track width being defined as b, the following relationship is satisfied:

respective $N/2^r$ head gaps of the head gaps have respective widths equal to $b \times N/2^s$, and
at least one head gap of the head gaps has a width equal to $b \times N$,
where r is an integer number having an initial value of 1 which is incremented by 1 to a final value of $\log_2 N$, s is an integer number having an initial value of $\log_2 N$ which is decremented by 1 to a final value of 1, each value of r has a corresponding value of s, and N equals $2^n$, where n is an integer number greater than 0.

3. The magnetic head arrangement according to claim, 2, wherein N head gaps of the head gaps are numbered E0 to E(N-1) and are located in N planes B0 to B(N-1) perpendicular to a direction of displacement of the recording medium, and wherein:

the head gaps with width b are laid out in odd numbered planes of the N planes so as to write/read on odd numbered tracks of the N tracks;
the head gaps with width b×2 and width b×4 are alternatingly laid out in the remaining even numbered planes of the N planes beginning with the head gaps with widths b×2; and the head gap with width b×N is in the plane B0.

4. The magnetic head arrangement according to claim 3, wherein the head gaps of the at least one group of heads are aligned along a row.

5. The magnetic head arrangement according to claim 4, wherein the at least one group of magnetic heads comprises:

several groups of magnetic heads arranged perpendicular to the displacement direction of the recording medium, magnetic heads in the several groups of magnetic heads lying in the same respective planes B0 to B(N-1) have the same gap width; and wherein the magnetic head arrangement further comprises:

column control wires passing through magnetic heads of the several groups of magnetic heads in the same plane B0 to B(N-1), respectively; and row control wires passing through the magnetic heads of each group of several magnetic heads, respectively.

6. The magnetic head arrangement according to claim 5, wherein the at least one group of magnetic heads includes at least one erase head.

7. The magnetic head arrangement according to claim 6, wherein an erase head gap of the at least one erase head lies in a plane parallel to the head gaps of the at least one group of magnetic heads.

8. The magnetic head arrangement according to claim 7, further comprising:

a write/read marking head having a head gap in a plane parallel to the planes B0 to B(N-1) of the head gaps of the several groups of magnetic heads.

* * * * *

UNITED STATES PATENT AND TRADEMARK OFFICE
CERTIFICATE OF CORRECTION

PATENT NO.   : 5,771,142
DATED        : June 23, 1998
INVENTOR(S)  : Francois MAURICE, ET AL.

It is certified that error appears in the above-identified patent and that said Letters Patent is hereby corrected as shown below:

On the title page, Item [54], the title, is incorrect.
It should read:

-- MULTITRACK MAGNETIC WRITE/READ HEAD ARRANGEMENT WITH INTEGER MULTIPLE HEAD GAP WIDTHS --

Signed and Sealed this

Twenty-ninth Day of December, 1998

Attest:

BRUCE LEHMAN

*Attesting Officer*   *Commissioner of Patents and Trademarks*